Patented May 14, 1946

UNITED STATES PATENT OFFICE 2,400,383

TETRAETHYL LEAD

William de Benneville Bertolette, Baton Rouge, La., and Alfred Edwin Parmelee, Wilmington, Del., assignors to E. I. du Pont de Nemours & Company, Wilmington, Del., a corporation of Delaware No Drawing. Application May 15, 1941, Serial No. 393,680

11 Claims. (Cl. 260—437)

This invention relates to the purification of tetraethyl lead and particularly to the preparation of tetraethyl lead free of sludge-forming compounds.

The present commercial method of manufacturing tetraethyl lead comprises reacting ethyl chloride or a mixture of methyl chloride and ethyl chloride with lead mono-sodium alloy at about 30 to 90° C. Upon the completion of the reaction, the reaction mass is drowned in a large volume of water and then steam is passed through the mixture to drive off the tetraethyl lead and other compounds by steam distillation. The resulting tetraethyl lead is usually impure, frequently containing unreacted ethyl chloride, finely divided suspended materials, such as finely divided metallic lead, and sludge-forming compounds. Some of the most common sludge-forming compounds are unstable bismuth compounds.

Ethyl chloride, when present in the tetraethyl lead, will tend to volatilize into the air space of storage tanks to form an explosive mixture. The suspended matter, when present, may be removed as disclosed by A. E. Parmelee in Patent 1,975,171. However, the tetraethyl lead, purified by such method, is not entirely free of objectionable impurities, since such method does not remove the sludge-forming impurities. When tetraethyl lead, even after the purification by the method of Patent 1,975,171, is allowed to stand, sludge gradually forms which deposits in tank cars, drums and storage tanks. Such sludge is highly objectionable and requires frequent removal and disposal. Frequently, the sludge is very reactive on exposure to air sometimes causing explosions and it contains tetraethyl lead which is poisonous and hazardous to handle. Accordingly, the removal and disposal of the sludge is a hazardous task requiring special equipment and specially trained workers.

The problem of sludge formation of tetraethyl lead on standing has long been recognized and various means of preventing it have been proposed. A number of compounds have been proposed and patented for inhibiting the formation of sludge, but none of them has met with any material commercial success. Also, various methods have been proposed for purifying the tetraethyl lead. However, up to the time of our invention, the formation of sludge in tetraethyl lead remained a serious problem in the industry.

An object of our invention is to overcome the difficulties heretofore caused by the formation of sludge in tetraethyl lead and mixtures containing it. Another object is to provide a method of purifying tetraethyl lead so as to remove sludge-forming compounds and to provide stable tetraethyl lead compositions. A further object is to provide an improved method of purifying tetraethyl lead. A still further object is to provide a simple method for removing sludge-forming compounds, suspended matter and ethyl chloride from crude tetraethyl lead. Other objects are to provide new compositions of matter and to advance the art. Still other objects will appear hereinafter.

The above and other objects may be accomplished, in accordance with our invention, by treating the crude tetraethyl lead, obtained from the reaction of ethyl chloride on lead-sodium alloy, with oxygen until sludge is formed, and then separating the sludge from the tetraethyl lead. We have found that, by treating the crude tetraethyl lead with oxygen so that the oxygen is brought into contact with all parts of the tetraethyl lead, the sludge-forming compounds are rapidly converted to sludge which may be readily separated from the tetraethyl lead. If the tetraethyl lead, at the same time, contains suspended matter, the sludge, as thus formed, will collect the suspended matter and carry it out of the tetraethyl lead. We have found that, by our treatment, substantially all of the sludge-forming compounds are rapidly converted to sludge and precipitated and, after the precipitated sludge has been removed from tetraethyl lead, the resulting product is essentially free of sludging materials and may be stored indefinitely without visible sludge formation. Such purified tetraethyl lead does not require the presence of sludge inhibitors or other materials to prevent sludge formation.

The preferred method of carrying out our invention comprises blowing air through the tetraethyl lead while employing agitation to insure dispersion of the air throughout the tetraethyl lead. The sludge-forming compounds are rapidly converted to sludge and may be removed from the tetraethyl lead by filtration, washing or other suitable means. Some of the sludge has a tendency to collect on the sides of the vessel in which the aeration is caused to take place and, when the tetraethyl lead has been removed from the vessel, constitutes a hazard. The collection of the sludge on the sides of the vessel may be largely avoided by maintaining a layer of water over the surface of the tetraethyl lead during the aeration and allowing the mixture to settle before drawing off the tetraethyl lead. When such water layer is employed, the sludge is preferentially carried to the water layer and may be removed therewith after separation of the tetraethyl lead. Frequently, even with the water layer, a small amount of sludge remains suspended in the tetraethyl lead and must be removed by filtration. However, the amount of sludge retained by the tetraethyl lead, under such circumstances, is small and very much larger amounts of tetraethyl lead may be passed through the filters before cleaning of the filters is made necessary.

Oxygen or other oxygen-containing gases may be substituted for air if desired. Mechanical means may be employed for agitation of the tetraethyl lead during the treatment or other means may be employed for providing agitation, such as a sufficiently strong stream of the oxygen-containing gas.

If the crude tetraethyl lead should contain unreacted ethyl chloride, the air or other oxygen-containing gas, on passing through the tetraethyl lead, will remove such ethyl chloride. Under such circumstances, the gaseous mixture, leaving the surface of the liquid, is an extremely explosive mixture. The possibility of explosion can largely be avoided by diluting the effluent gaseous mixture with air or other gas, as by blowing air across the surface of the liquid. Also, the danger of explosions may be avoided by first passing nitrogen or some other inert gas through the tetraethyl lead to remove the ethyl chloride prior to the aeration step.

Our process will preferably be carried out at room temperatures. Higher or lower temperatures can be employed if desired. However, temperatures of over 110° C. should be avoided in order to avoid decomposition of the tetraethyl lead. Temperatures up to 50° C. have been employed satisfactorily in practice. The time of aeration will vary with the particular method of bringing the oxygen into contact with the tetraethyl lead, the proportion of oxygen employed per unit of time, the rate of agitation, temperatures and other conditions employed. Complete conversion of the sludge-forming materials to sludge has been accomplished in as little as 10 minutes with small quantities of tetraethyl lead and efficient aeration. In other cases, periods up to one hour have been employed and, when very large amounts of tetraethyl lead are treated, it is usually desirable to extend aeration for one hour in order to insure complete conversion of the sludge-forming compounds to sludge.

When the aeration is carried out in the presence of a water layer, the amount of water may be very greatly varied. It will usually be desirable to employ sufficient water so that a continuous layer of water remains on the surface of the tetraethyl lead during aeration. The continuous water layer is generally desired to wash the air or other oxygen containing gas free of tetraethyl lead so that substantially no tetraethyl lead is allowed to escape to the atmosphere. We have successfully employed one part of water to from 1 to 20 parts of tetraethyl lead. We preferably employ at least 1 volume of water to 5 volumes of tetraethyl lead. However, the quantity of water may be largely varied outside of such limits and the amount used, in any event, is largely dependent upon the dimensions of the vessel in which the aeration is carried out, the agitation facilities and the violence of the agitation employed.

The amount of air or oxygen employed may also be widely varied. The quantity of oxygen required theoretically is small. However, it is desirable to have a large excess of oxygen present to insure good distribution of the oxygen throughout the tetraethyl lead. The amount of oxygen employed and the rate of treatment of the tetraethyl lead therewith depends mainly on the amounts of tetraethyl lead being treated, the size of the equipment and the facilities for introducing and removing the air or oxygen.

In order to illustrate our invention more clearly, the preferred modes of carrying the same into effect and the advantageous results to be obtained thereby, the following examples are given:

EXAMPLE I

Approximately 2000 gallons of water and 30,000 pounds of tetraethyl lead are placed in a large covered tank provided with an agitator. This constitutes about 1 volume of water for each volume of tetraethyl lead. The mixture is agitated while air is blown through the contents of the tank for 1 hour at the rate of approximately 10 cubic feet per minute. At the end of this time, the mixture is allowed to settle for another hour. After the settling period, clear tetraethyl lead is drained from the bottom of the tank through a sight glass, and the precipitated compounds and other solids are left in the water layer. Although the tetraethyl lead is practically entirely free of solids, it is run through a filter because small quantities of sludge occasionally stick to the walls of the tank and break loose while the tetraethyl lead is being drawn off.

Analysis of the tetraethyl lead, before it is air blown, shows it to have a potential sludging capacity of 1.054 pounds of sludge per 100 gallons of tetraethyl lead. That is, if 100 gallons of this material were allowed to stand until oxidation was complete, 1.054 pounds of sludge would be formed. Analysis of the purified material, after the above described treatment, shows a potential sludge content of only 0.015 pound per 100 gallons of tetraethyl lead. This represents a removal of 98.6% of the potential sludge. Chemical analysis shows this tetraethyl lead to be free of bismuth, and spectrographic analysis reveals the absence of other metallic impurities. Samples of the purified material remained clear when stored in the dark for several months; a period during which samples of the untreated material show formation of practically all of the potential sludge.

EXAMPLE II

Different samples of commercially produced tetraethyl lead were treated by passing a steady stream of compressed air through them at the rate of approximately 6 bubbles per second for various periods of time. The air was passed through a glass wool filter before it was introduced into the tetraethyl lead. After passing through the tetraethyl lead, the air was passed through an aqueous solution of iodine to prevent contaminating the atmosphere with fumes of the tetraethyl lead and the like. After the first period of aeration, each sample was filtered to determine the amount of sludge formed. This process was repeated with each sample until no sludge was formed. The results are shown in Table I.

*Table I*

| Sample | Weight of sample | Time of aeration | Wt. of sludge |
|---|---|---|---|
| | Grams | | |
| 1 | 700 | 1 hr. | .344 |
| | | 2 hr. | 0 |
| | | 3 hr. | 0 |
| 2 | 830 | 30 min. | .301 |
| | | 1 hr. | 0 |
| 3 | 830 | 15 min. | .183 |
| | | 30 min. | 0 |
| 4 | 830 | 5 min. | .387 |
| | | 10 min. | .205 |
| | | 15 min. | 0 |

It will be understood that the above examples have been given for illustrative purposes only and that various modifications and variations may be made therein without departing from the spirit of our invention. The process may be applied to mixtures of tetraalkyl lead compounds prepared from mixtures of methyl chloride and ethyl chloride.

The oxygen or oxygen-containing gas may be mixed with the tetraethyl lead by various other methods which will bring the oxygen into intimate contact with all portions of the tetraethyl lead. For example, the tetraethyl lead may be sprayed into an atmosphere of air or oxygen, particularly in a closed chamber. The tetraethyl lead may be passed through a washing tower or reaction tower countercurrent to oxygen-containing gas. The tetraethyl lead may be passed through pipes containing openings in the walls thereof for introducing air into the pipes by injection or by aspiration caused by the tetraethyl lead passing such openings. When the tetraethyl lead is treated with oxygen in the absence of a water layer, it may thereafter be washed with water in any suitable manner for removing the sludge. It will be seen that, by our invention, we have provided a simple, inexpensive method of purifying tetraethyl lead, whereby a stable non-sludging product is obtained. We have thus avoided the necessity for the use of expensive sludge inhibitors and have obtained a commercial product which is more stable than any heretofore known. We have successfully overcome a serious problem which has long existed in the industry. We have, by our invention, eliminated many of the hazards of handling tetraethyl lead with material savings to the consumers thereof. We have also made it possible to eliminate a treatment, that of Patent 1,975,171, which has heretofore been considered necessary. We have done all this by a simple and very economical treatment which can be readily carried out in a short space of time in simple and inexpensive equipment. Accordingly, our invention is of great utility and fulfills a long felt want.

We claim:

1. The method of purifying tetraethyl lead containing sludge-forming bismuth compounds which comprises aerating the tetraethyl lead with an oxygen-containing gas until said bismuth compounds have been converted to sludge and then separating the sludge from the tetraethyl lead.

2. The method of purifying tetraethyl lead containing sludge-forming bismuth compounds which comprises passing an oxygen-containing gas through the tetraethyl lead until said bismuth compounds have been converted to sludge and then separating the sludge from the tetraethyl lead.

3. The method of purifying tetraethyl lead, obtained by the reaction of ethyl chloride on lead-monosodium alloy and containing sludge-forming compounds which comprises agitating the tetraethyl lead while treating it with oxygen until sludge is formed, maintaining a layer of water on the surface of the tetraethyl lead during such treatment, settling the mixture until a layer of purified tetraethyl lead forms below the water layer, and drawing off the purified tetraethyl lead.

4. The method of purifying tetraethyl lead, obtained by the reaction of ethyl chloride on lead-monosodium alloy and containing sludge-forming compounds which comprises agitating the tetraethyl lead while treating it with oxygen until sludge is formed, maintaining a layer of water on the surface of the tetraethyl lead during such treatment, settling the mixture until a layer of purified tetraethyl lead forms below the water layer, drawing off the purified tetraethyl lead, and separating any suspended sludge from the purified tetraethyl lead.

5. The method of purifying tetraethyl lead, obtained by the reaction of ethyl chloride on lead-monosodium alloy and containing sludge-forming compounds which comprises agitating the tetraethyl lead while passing an oxygen-containing gas through it until sludge is formed, maintaining a layer of water on the surface of the tetraethyl lead during such treatment, settling the mixture until a layer of purified tetraethyl lead forms below the water layer, and drawing off the purified tetraethyl lead.

6. The method of purifying tetraethyl lead, obtained by the reaction of ethyl chloride on lead-monosodium alloy and containing sludge-forming compounds which comprises agitating the tetraethyl lead while blowing air through it until sludge is formed, maintaining a layer of water on the surface of the tetraethyl lead during such treatment, settling the mixture until a layer of purified tetraethyl lead forms below the water layer, and drawing off the purified tetraethyl lead.

7. The method of purifying crude tetraethyl lead, obtained by the reaction of ethyl chloride on lead-monosodium alloy and containing sludge-forming bismuth compounds, which comprises mixing an oxygen-containing gas through the tetraethyl lead so as to bring the oxygen into intimate contact with all portions of the tetraethyl lead until said bismuth compounds have been converted to sludge and then separating the sludge from the tetraethyl lead.

8. The method of purifying crude tetraethyl lead, obtained by the reaction of ethyl chloride on lead-monosodium alloy and containing sludge-forming bismuth compounds, which comprises blowing air through the tetraethyl lead until said bismuth compounds have been converted to sludge and then separating the sludge from the tetraethyl lead.

9. The method of purifying crude tetraethyl lead, obtained by the reaction of ethyl chloride on lead-monosodium alloy and containing ethyl chloride and sludge-forming bismuth compounds, which comprises passing an oxygen-containing gas through the tetraethyl lead until said bismuth compounds have been converted to sludge and then separating the sludge from the tetraethyl lead.

10. The method of purifying crude tetraethyl lead, obtained by the reaction of ethyl chloride on lead-monosodium alloy and containing ethyl chloride and sludge-forming bismuth compounds, which comprises blowing air through the tetraethyl lead until said bismuth compounds have been converted to sludge and then separating the sludge from the tetraethyl lead.

11. The method of purifying crude tetraethyl lead, obtained by the reaction of ethyl chloride on lead-monosodium alloy and containing suspended matter and sludge-forming bismuth compounds, which comprises aerating the tetraethyl lead with an oxygen-containing gas until said bismuth compounds have been converted to sludge and then separating the sludge from the tetraethyl lead.

WILLIAM DE B. BERTOLETTE.
ALFRED E. PARMELEE.